United States Patent [19]
Fredrickson

[11] 3,908,029
[45] Sept. 23, 1975

[54] METHOD FOR DRYING PASTA PRODUCTS WITH MICROWAVE HEATING

[75] Inventor: Clyde Fredrickson, Danville, Calif.

[73] Assignee: Microdry Corporation, San Ramon, Calif.

[22] Filed: June 29, 1972

[21] Appl. No.: 267,452

[52] U.S. Cl. ............... 426/242; 426/158; 219/10.55
[51] Int. Cl.² ............................................ A21D 6/00
[58] Field of Search ...... 99/85; 219/10.55; 426/158, 426/241

[56] References Cited
OTHER PUBLICATIONS

Matz, *The Chemistry and Technology of Cereal as Food and Feed,* The Air Publishing Co., Westport, Conn. 1959, pp. 299–308.

*Primary Examiner*—Raymond N. Jones
*Attorney, Agent, or Firm*—Carl C. Batz

[57] ABSTRACT

Moist pasta, such as macaroni and spaghetti, is passed into a microwave treatment chamber containing circulating warm air to heat and dry the pasta, and the hot dry pasta is passed into a cooling chamber where air is circulated with steam being added to maintain an elevated humidity level and the air maintained at elevated temperature until the pasta has cooled to below the critical range of from 180° to 160° F.

Apparatus is disclosed in which a casing houses microwave treatment chambers in its upper part and a cooling chamber in its lower part with structure for circulating air from the central upper part into the microwave chambers on either side and with air circulating means in the cooling chambers for injecting steam and cooling air into the circulating air in this chamber as may be needed to maintain humidity and temperature in this cooling chamber.

8 Claims, 2 Drawing Figures

METHOD FOR DRYING PASTA PRODUCTS WITH MICROWAVE HEATING

This invention relates to methods and apparatus for the drying of pasta materials, and more particularly to methods and apparatus for rapidly drying such materials while avoiding damage to the materials so as to prepare a dried product of high quality.

BACKGROUND

Pasta materials with which this invention is concerned are those initially formed by blending flour, water and salt, with egg materials being included to make some of the products. The pasta products include noodles, macaroni, spaghetti and others of this general class of product.

When the mixtures of flour, water, salt, etc. are blended they contain moisture to the extent of about 30 percent or more and the practice has been to form the blended mixtures into the shapes as may be desired and then hold the formed products in a drying atmosphere until the moisture comes down to about 6 to 14 percent, which takes a period of about 5 to 15 hours, usually at temperatures of from 100° to 130° F. This extended drying period not only requires a large plant with a great amount of drying space, but gives opportunity for the development of bacteria within the product. The moist warm condition of the pasta being held provides a good medium for the development of some of the objectionable bacteria.

It would be very desirable to have a method of drying the pasta materials in a much shorter period than has been required in commercial practice heretofore, if only such a method could be provided which would not also damage the product in some way.

It has been suggested that instead of heating the pasta materials in the regular way that the materials be subjected to treatment with microwave energy, and attempts have been made to heat and dry the pasta materials by the application of microwave energy. However, it has been found that although microwave energy is effective for quickly drying pasta, the product when so dried has been badly checked and glazed, so that it has not been commercially acceptable. The products are said to be checked when cracks form in a network pattern on the surface of the product. This causes the product to break up when cooked. The products are said to be glazed when the cracks are about to form and the surface takes on a characteristic appearance indicative of an inferior product. The percent of the product which is checked or glazed is sometimes given as an indication of the quality of the product.

SUMMARY OF THE INVENTION

I have discovered that microwave treatment may be employed in the drying of pasta products if the products so treated are cooled through a critical temperature range under certain controlled conditions. More specifically, I have discovered that by subjecting the heated pasta resulting from microwave drying to an atmosphere into which moisture is added and an elevated temperature maintained until the product cools to less than about 160° F., the glazing and checking with which microwave drying has been associated, can be substantially avoided.

Preferred ways of carrying out my process and improved apparatus for use in accordance with my invention will now be described and demonstrated.

DETAILED DESCRIPTION

Figure 1:
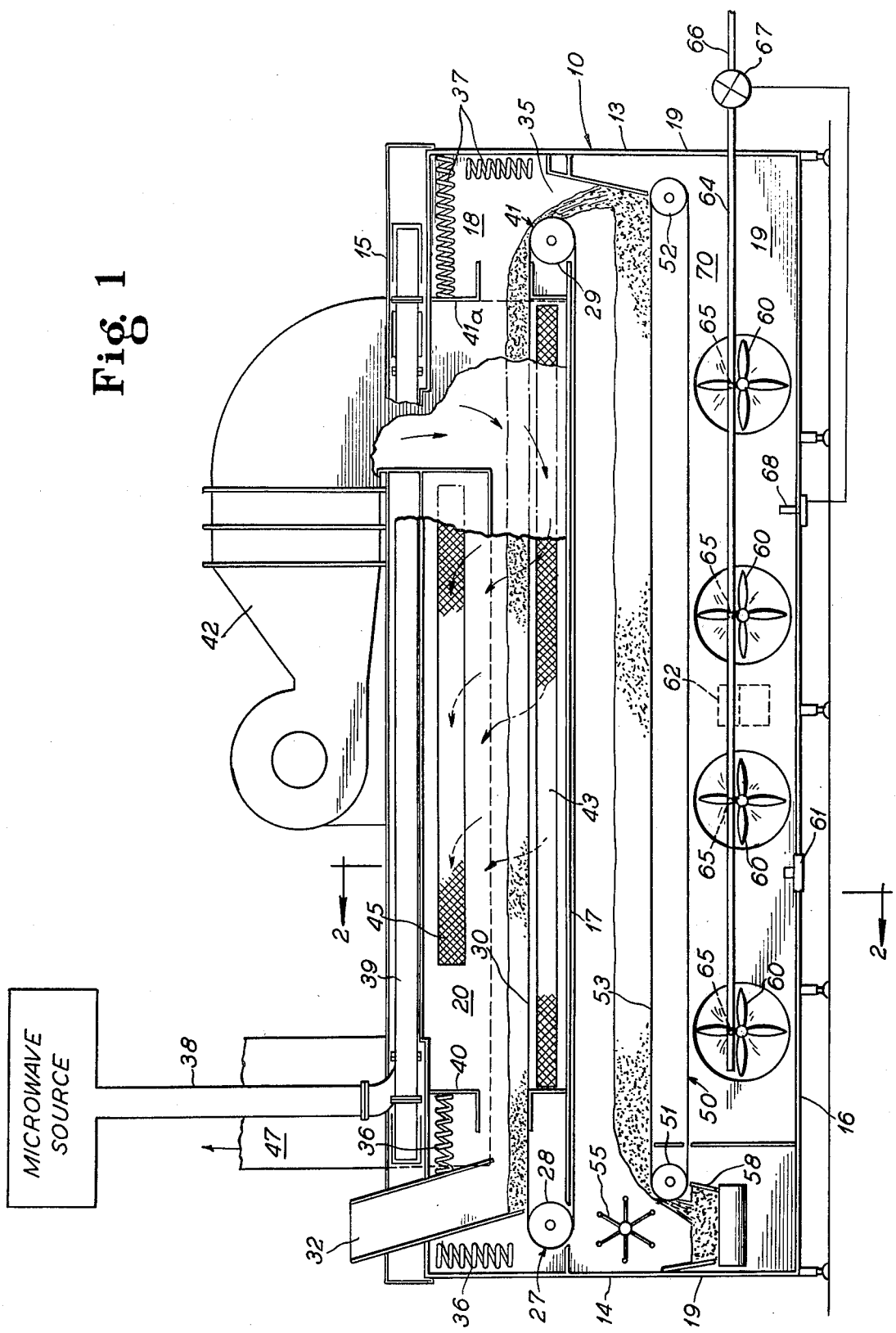
Figure 2:
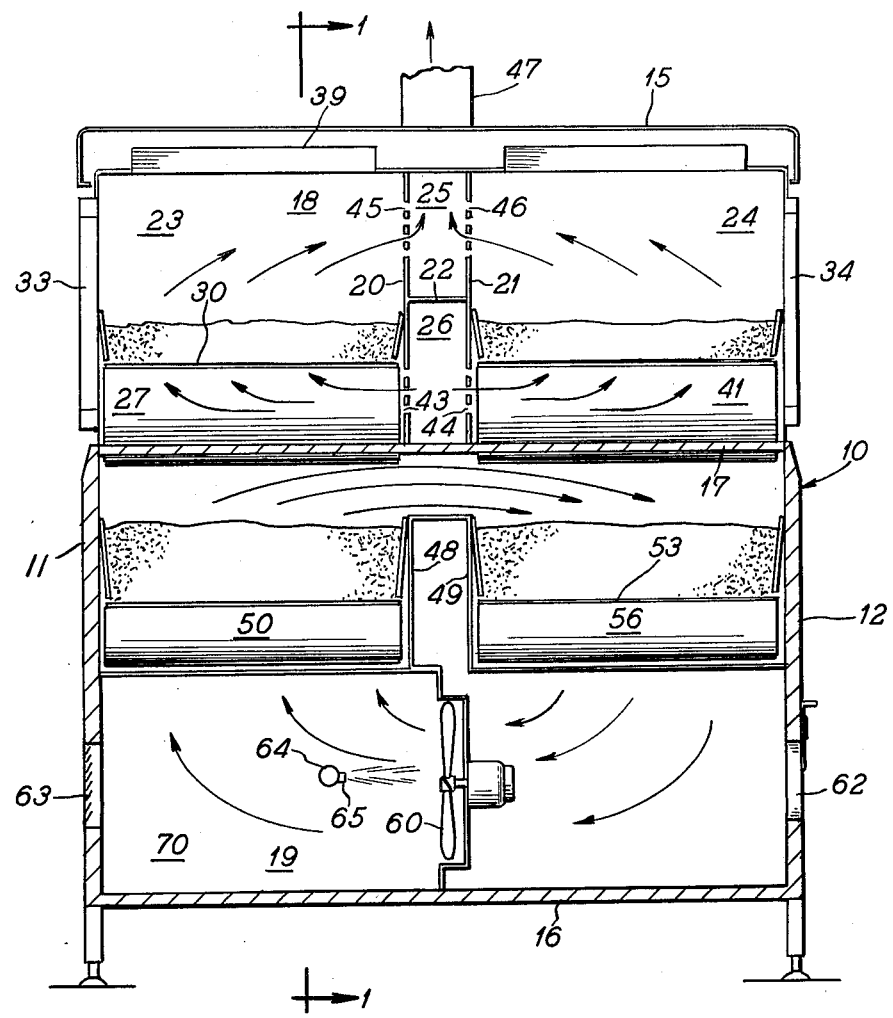

An embodiment of the improved apparatus is illustrated in the accompanying drawings in which:

FIG. 1 is a sectional view in side elevation of the apparatus, the section being taken along line 1—1 of FIG. 2; and FIG. 2 is a sectional view in end elevation, the section being taken along line 2—2 of FIG. 1.

As illustrated, the apparatus includes a casing 10 in rectangular form having sides 11 and 12, and ends 13 and 14, top 15 and bottom 16. A partition 17 at an intermediate level divides the interior of the casing 10 into two parts, an upper part 18 and a lower part 19. The upper part is for the microwave treatment and it is of some importance that the walls of this part be of metal or other electrically conductive material which reflects, rather than absorbs, microwaves.

The upper part 18 contains two parallel vertical partitions 20 and 21 and a central horizontal partition 22 which divides the top part into left and right chambers 23 and 24 and provides longitudinal ducts 25 and 26. Doors 33 and 34 are provided for convenience in cleaning the chamber.

Extending within chamber 23 is a conveyor 27 having end rolls 28 and 29 and a belt 30, this belt being made of a plastic material which is substantially transparent to microwaves. Further, this belt is perforated and may be in the form of a screen so as to permit transmission of air therethrough. This conveyor 27 is driven through one of the end rolls 28 and 29, the speed at which the roll is driven being controlled in a manner known to the art.

An inlet opening at one end of chamber 23 is provided by chute 32 through which the material to be dried may be introduced onto conveyor 27, and an outlet opening 35 is provided at the other end of the chamber through which treated material is dropped out of the chamber.

To guard the inlet opening against the transmission of more than a minute amount of microwave energy through the opening, I provide the coils 36 which are made of plastic or some other material transparent to microwaves and through which a lossy liquid such as water is circulated. In this way energy which tends to leak out through the inlet opening is absorbed into the liquid and carried away as heat in the liquid. I provide similar coils 37 for carrying away energy which might otherwise tend to escape as microwaves through the outlet opening 35.

Microwave energy from a generator or other suitable source is supplied through waveguide 38 to a distributor conduit 39 extending longitudinally within chamber 23. conduit 39 has a series of openings in its lower side which are longitudinally spaced for non-resonance in the manner explained in U.S. Pat. No. 3,263,052, so that the energy is discharged uniformly over the length of the conveyor 27. Baffles 40 and 41a are provided to help confine the energy and to prevent leakage through the inlet and outlet openings.

The microwave energy to which I refer has a frequency of 400 MHZ or higher. Frequencies in common use for industrial heating are either 2450 MHZ or 915 MHZ, these frequencies having been approved for such purposes by government agencies, but my invention may, of course, be used with other specific frequencies. The power utilized depends upon the design of the apparatus and the material being treated and the rate at which the material is fed to the apparatus, but in one specific design of apparatus I have found that power of from 5 to 20 kw is satisfactory.

The chamber 24 contains a conveyor 41 similar to the conveyor 27, has inlet and outlet openings similar to inlets 32 and 35 guarded by coils 36 and 37 and baffle 41a similar to baffle 40. A waveguide connected to a microwave source delivers energy to a distributor like distributor 39 extending within chamber 24.

A blower 42 which is connected to a source of warm air at a temperature of from 150° to 250° serves to blow this air into the chambers 23 and 24. The outlet of the blower is connected to the conduit 26 which contains the grill opening 43 leading to chamber 23 and grill opening 44 leading to chamber 24, where in each chamber the circulating air passes upwardly through the conveyor and any material contained on it to the upper portion of the chamber from which it exits through grill openings 45 and 46 in the sides of conduit 25, and is discharged through conduit 47 to the atmosphere. The lower part 19 of casing 10 encloses the chamber 70 into which the material being treated is received and in which this material is cooled.

A similar conveyor 56 extends between the right side of chamber 19 and wall 49 having end rolls 51 and 52 and a belt 53. This belt is of the screen type or contains perforations through which air may be circulated. Conveyors 50 and 56 are designed to run toward the front end of the chamber 70 which is a direction opposite to the direction of conveyors 27 and 41. The conveyors 50 and 56 are run at a controlled speed so that the material contained on them is held in the atmosphere of the chamber 70 for a desired period of time. Near the forward end of conveyors 50 and 56 are distributor wheels 55 which are provided to scatter the material coming from conveyor 50 as it falls into the trough 58 which leads to an opening out of the chamber.

Fans 60 are mounted below walls 48 and 49 and are arranged, in the embodiment illustrated, to impel air from the right hand side of chamber 70 (FIG. 2) to the left hand side of this chamber. The air so circulated passes upwardly through conveyor 50 and any material contained thereon, over the top of walls 48 and 49 and down through conveyor 56 and any material contained thereon, and again is impelled by fans 60.

A temperature gauge 61 is provided to indicate the temperature of the air within chamber 70 and the adjustable opening 62 is provided through which room air may be admitted as necessary to cool the air in this chamber to the desired temperature, and outlet opening 63 is provided to accommodate the removal of air from the chamber.

For adding moisture to the air within chamber 70 I provide the pipe 64 having spray nozzles 65 just back of fans 60 with the spray in the direction opposite the direction of air flow toward the fans. Pipe 64 is fed by the steam line 66 in which is flow control device 67. Device 67 is sensitive to and regulated by the hygrometer 68. This arrangement provides automatic control of humidity within chamber 70.

OPERATION

I shall now describe the general practice of my invention using the apparatus herein illustrated.

The pasta which is to be dried, and which may be macaroni, spaghetti, noodles or the like, having a moisture content, upon blending, of about 30 percent, is preferably subjected first to a conventional drying step in accordance with the usual practice of this art in which the pasta is subjected to heat and drying atmosphere to reduce the moisture to something of the order of about 18 to 23 percent. At this moisture content, the moisture is easily removed, and this reduction in moisture content is obtained in something like 20 to 30 minutes. By the term "moist pasta" I mean pasta which still needs to be dried in order to be an acceptable commercial product whether or not the pasta may have been pretreated by conventional drying steps.

The pasta, having a moisture content of about 20 percent or more, is fed through the chutes 32 where it comes to rest on top of belts 30 and 44 which are then moving so as to transport the pasta toward the rear end of the chambers 23 and 24.

Microwave power is delivered to chambers 23 and 24 over the pasta being transported therein, and warm air of a temperature of from 150° to 250° F. is circulated by blower 42 through conduit 26, through grills 43 and 44, up through conveyors 27 and 41, and out through grills 45 and 46 and conduit 47 to the atmosphere.

The pasta absorbs the microwave energy being reflected in chambers 23 and 24 and is heated uniformly from its interior to its external surfaces. Moisture comes to its surfaces and is carried away by the circulating air.

The passage of the pasta on conveyors 27 and 41 to the ends of the conveyors may take something like 4 to 15 minutes during which period the pasta is absorbing energy and is heated internally and throughout its mass, and moisture is removed to the desired degree, desirably to from 6 to 15 percent moisture content or from 13 to 15 percent moisture content and having a temperature in excess of 175° F. or of the order of 180° to 210° F desirably 180° to 190° F. It should be understood that though dry the pasta is at these temperatures still in a pliable state and is not rigid in character.

When the pasta, now in a substantially dry state, reaches the end of conveyors 27 and 41 it falls down through the outlet openings into the cooling chamber 70 and onto the top of the conveyors 50 and 56 which take it back in the opposite direction within chamber 70. During its passage on conveyors 50 and 56 the pasta is subjected to circulating air, the air having been impelled by fans 60 and passed upwardly through conveyor 50 and the dry pasta contained thereon, over walls 48 and 49, and downwardly through the pasta contained on top of conveyor 56. The air is regulated as to humidity by the introduction of steam through pipe 64 and nozzles 65, the amount of steam introduced being regulated by device 67 to provide the desired relative humidity of about 75 to 100 percent. I prefer that the humidity be controlled to between 80 and 95 percent, 80 percent or 85 percent being considered the best.

The air within chamber 70 may be regulated by controlling the size of opening 62. Due to the operation of fans 60 the air pressure within the chambers is somewhat lower at the air inlet opening 62 than at the outlet opening 63 so by increasing the size of the air inlet the temperature of the air within chamber 70 may be reduced to the desired extent. It may be understood that pasta comes to this chamber quite hot giving off heat as it is cooled, and some cooling air is required through inlet 62 to maintain the desired temperature of from 70° to 120° F., preferably 80° to 100° F. (A sliding door 62a is provided for regulating the size of the opening 62.)

When the pasta completes its cooling treatment and reaches the end of conveyors 50 and 56 it is spread and distributed by the wheels 55 and falls into the troughs 58 from which it passes outside the chamber, and may be put into packages for market. During its passage through chamber 70 the pasta is cooled through the critical range of 180° to 160° F. and is discharged in rigid form from the chamber 70 at a temperature below 160° F. and preferably about 120° F. or lower.

Also during its passage through the cooling chamber 70 which takes something like 20 to 40 minutes, preferably about 30 minutes, the pasta loses further moisture which may be of the order of 0.5 to 2 percent.

The product when examined after a period of several hours is found to be of good appearance and quality with substantially no glaze or checks.

While I do not know with certainty why the treatment of pasta as above described is succesful I believe it may be explained as follows:

In contrast to usual methods of heating where the heat is absorbed from the surface of the pasta pieces toward their interior, the microwave treatment heats the pasta uniformly on the interior as well as the exterior, but due to the evaporation taking place on the surfaces of the pasta the surfaces are cooled making a temperature gradient where the temperature is higher on the interior than it is on the exterior of the pasta pieces. Under ordinary conditions of storage, the pasta having such a temperature gradient, tends to glaze and check, making an unmarketable product, the checked product tending to break up during cooking.

When in accordance with my invention the microwave treated pasta is cooled through the critical range of 180° to 160° F. during which period it changes from a pliable state to a rigid state and during this period additional moisture is supplied and an elevated heat level maintained, this seems to counteract or compensate for the peculiar temperature gradient imparted to the pasta through microwave treatment, and the product comes out without damage and free of glaze and checks. In giving this explanation of the results obtained by my invention I mean no disclaimer in the event these results are found to be better explained on some other theory.

To further demonstrate my invention, I give the following specific examples of the operation of the invention:

EXAMPLE I

Noodles which have been pretreated by a conventional drying step to reduce their moisture to 21 percent were subjected to treatment with microwave energy at a frequency of 915 MHZ at 17.5 kw at a rate of 1,150 lbs/hr while circulating air in the microwave treating chamber at a temperature of 190° F., the time of the treatment being 12 minutes. At the end of this treatment the noodles had a moisture content of 14 percent and a temperature of 186° F. At this point the noodles were passed through a cooling chamber in which air was circulated about the pasta at a relative humidity of 90 percent and a temperature of 100° F. during a period of 32 minutes, and at the end of this period the pasta product had a temperature of 107° F. and a moisture content of 12.6 percent. This product was then packaged and stored. After a storage period of 12 hours the pasta was found to be of good quality and was considered to be a good commercial product.

EXAMPLE II

Macaroni in elbow shape, 0.182 inch by three fourths inch long, having a moisture content of 21 percent, was subjected to treatment with microwave energy at a frequency of 915 MHZ at a microwave power level of 15 kw at a rate of 600 lbs/hr while circulating air in the microwave treating chamber at a temperature of 190° F., the time of the treatment being 10 minutes. At the end of this treatment the macaroni had a moisture content of 14 percent and a temperature of 190 °f. At this point the macaroni was passed through a cooling chamber in which air was circulated about the pasta at a relative humidity of 84 percent and a temperature of 97° F. during a period of 32 minutes, and at the end of this period the pasta product had a temperature of 120° F. and a moisture content of 13.1 percent. After a storage period of 12 hours the macaroni was tested and found to be a good commercial product with the minimum of glazing and no checking.

EXAMPLE IIA

Following is a report of a drying run in which microwave energy was employed without the cooling procedure set forth in this specification. This example is given as a control in the demonstration of my invention.

Elbow macaroni of the same type as employed in Example II was fed to the microwave treating chamber at a rate of 600 lbs/hr using a microwave frequency of 915 MHZ at a power level of 15 kw while circulating air in the microwave treating chamber at a temperature of 185° F., the time of the treatment being 12 minutes. At the end of this treatment the macaroni had a moisture content of 14.3 percent and a temperature of 175° F. At this point the macaroni was packaged and stored in the regular way. After a storage period of 12 hours the macaroni was tested and found to be of very poor quality being extensively glazed and checked. The product was not acceptable for sale.

EXAMPLE III

Spaghetti having a moisture content of 21 percent was subjected to a treatment with microwave energy at a frequency of 915 MHZ at a power level of 10 kw at a rate of 650 lbs/hr while circulating air in the microwave treating chamber at a temperature of 185° F., the time of the treatment being 12 minutes. At the end of this treatment the spaghetti had a moisture content of 13.7 percent and a temmperature of 180° F. At this point the spaghetti was passed through a cooling chamber in which air was circulated about the spaghetti at a relative humidity of 86 percent and a temperature of 97° F., and at the end of this period the spaghetti had a temperature of 120° F. and a moisture content of 12.9 percent. After a storage period of 12 hours the spaghetti was tested and found to be an acceptable commercial product with a very low degree of glazing and no checking.

EXAMPLE IV

Salad type macaroni, 0.182 inch in diameter by one fourth inch long and in cylindrical form was fed through a microwave chamber at a rate of 650 lbs/hr using microwave energy at a frequency of 915 MHZ at a power level of 15 kw while circulating air in the microwave chamber at a temperature of 195° F., the time of the treatment being 12 minutes. At the end of this treatment the macaroni had a moisture content of 14.3 percent and a temperature of 184° F. At this point the macaroni was passed through a cooling chamber in which air was circulated about the macaroni at a relative humidity of 90 percent and at a temperature of 104° F. for a period of 32 minutes. At the end of the cooling period the macaroni had a temperature of 108° F., and a moisture content of 13.3 percent. After a storage period of 12 hours the macaroni was tested and found to be of good quality, a good commercial product.

EXAMPLE V

Shell type macaroni, three eighth inch in size was passed into a microwave treatment chamber using microwave energy at a frequency of 915 MHZ at a power level of 7.5 kw being fed at a rate of 225 lbs/hr while circulating air in the microwave treating chamber at a temperature of 185° F., the time of the treatment being 13 minutes. At the end of this treatment the macaroni had a moisture content of 14.8 percent and a temperature of 180° F. At this point the macaroni was passed through a cooling chamber into which air was circulated about the macaroni at a relative humidity of 88 percent and a temperature of 102° F. At the end of this period the macaroni had a temperature of 110° F. and a moisture content of 14.0 percent. After a storage period of 12 hours the product was tested and found to have good color and to be an acceptable commercial product.

While I have given in this specification only certain demonstrations of my process and have illustrated only one embodiment of my improved apparatus, it is to be understood that many changes and variations may be made in the process and in carrying out of the invention as well as in the apparatus employed, all within the spirit of my invention and included in the scope of the apended claims.

What is claimed is:

1. A method of preparing pasta products comprising subjecting moist pasta to treatment with microwave energy to heat the same to a temperature in excess of 175° F. and to remove moisture therefrom, and cooling said heated pasta in an atmosphere having a relative humidity of from 75 to 100 percent and a temperature of from 70° to 120° F. until said pasta has an internal temperature below 160° F.

2. A method as set forth in claim 1 including the step of circulating air at a temperature of from 150° to 250° F. about said pasta while the pasta is being subjected to said treatment with microwave energy.

3. A method as set forth in claim 1 including the step of circulating air at a temperature of from 70° to 110° F. and a relative humidity of from 75 to 100 percent about said pasta as it is being cooled.

4. A method as set forth in claim 2 including subjecting said pasta to said microwave energy treatment while circulating air thereabout until the moisture thereof is less than 15 percent.

5. A method as set forth in claim 2 including subjecting said pasta to said microwave energy treatment until it has an internal temperature of at least 180° F. and a moisture content of not more than 15 percent.

6. A method of preparing pasta products comprising passing moist pasta through a first chamber while introducing microwave energy into said chamber, controlling the rate at which said pasta is moved through said chamber to permit heating of said pasta to a temperature in excess of 175° F. and a moisture content below 15 percent, passing said pasta through a second chamber while circulating through said second chamber and about said pasta air which has a temperature of from 70° to 120° F. and a relative humidity of from 75 to 100 percent, and controlling the rate at which said pasta is moved through said second chamber to permit cooling of said pasta to a temperature below 160° F.

7. A method as set forth in claim 6 wherein said moist pasta has a moisture content of at least 18 percent when introduced to said first chamber.

8. A method as set forth in claim 6 wherein said pasta is heated to a temperature of from 180° to 190° F. and a moisture content of 13 to 15 percent in said first chamber and is cooled in said second chamber to a temperature less than 160° F., the air circulated through said second chamber having a temperature of from 80° to 100° F. and a relative humidity of from 80 to 95 percent.

* * * * *